March 14, 1944.    A. C. HOFFMAN    2,343,867
CONGEALABLE LIQUID CONDITIONING DEVICE
Filed Aug. 25, 1941    2 Sheets-Sheet 1

Inventor
Allan C. Hoffman
By C. B. Stevens
Attorney

March 14, 1944.   A. C. HOFFMAN   2,343,867
CONGEALABLE LIQUID CONDITIONING DEVICE
Filed Aug. 25, 1941   2 Sheets-Sheet 2

Allan C. Hoffman INVENTOR.
BY
C. B. Stevens ATTORNEY.

Patented Mar. 14, 1944

2,343,867

UNITED STATES PATENT OFFICE 2,343,867

CONGEALABLE LIQUID CONDITIONING DEVICE

Allan C. Hoffman, Dayton, Ohio, assignor to United Aircraft Products, Inc., Dayton, Ohio, a corporation of Ohio Application August 25, 1941, Serial No. 408,152

15 Claims. (Cl. 257—2)

This invention pertains to a congealable liquid conditioning device, and particularly to a heat exchange unit for use in a lubricant conditioning system wherein lubricant is quickly brought to the desired viscosity and temperature for most efficient and economical use and thereafter maintained in such condition. While the invention will be hereinafter described as a part of the lubricant conditioning system of an aircraft engine, it will be understood that it is not limited thereto but is capable of application in connection with other systems and devices utilizing a congealable liquid and of which a heat exchange unit forms a part.

Due to the development of high horsepower motors, and especially such as are used in airplanes and tanks, and more recent types of automobiles and boats, it has been found desirable to condition the lubricating oil to the proper temperature and viscosity for most efficient and economical functioning and use in a minimum of time. As the operating parts of such motors function at a high rate of speed from initial starting, it is important that all moving parts thereof be properly lubricated from that moment, or as near to such moment as possible. The rate of oil flow to and over the parts to be lubricated is directly proportional to the viscosity of the oil.

Lubricating oils are quite sensitive to thermal change and tend to thicken or congeal throughout the circulatory system, and particularly in the radiator or heat exchange unit when the motor or other apparatus with which the system is used is at rest, or is functioning idly as, for example, during an airplane glide. The flow of oil at the moment of initial starting or speeding up of the motor or other apparatus is therefore quite slow, and continues so until the oil in the entire system is brought to the desired temperature and viscosity which heretofore has required considerable time, during which period the lubricating oil does not have the maximum flow and lubricating qualities desired.

The present invention provides a radiator or cooler unit for use in an oil circulatory system wherein the oil is circulated under pressure and subjected to heat, and which radiator or cooler unit embodies two alternative flow paths including a by-pass path adapted to initially circulate a small portion of the oil supply through the apparatus to be lubricated over and over again for quickly bringing such small portion of the oil to the desired temperature and viscosity. The main flow path includes the radiator or cooling unit through which oil is automatically deflected as its temperature increases and its viscosity becomes less. Means are provided which are responsive to the viscosity of the oil for directing the oil to one path or the other, or both, as the oil condition dictates, and means are likewise provided for effecting an interchange of heat between the oil flowing through the by-pass and the oil in the radiator unit to result in bringing the oil in both paths to approximately the same condition of temperature and viscosity as quickly as possible from the moment of initial oil flow of oil through the by-pass circuit.

An object of the invention is to provide a congealable liquid conditioning device of simple construction, and capable of being economically manufactured, and which will be efficient in operation, uniform in action, automatically controlled, and unlikely to get out of repair.

Another object of the invention is to provide a congealable liquid conditioning device wherein the circulation of oil therethrough is controlled by the degree of viscosity of the oil.

A further object of the invention is to provide a congealable liquid conditioning device embodying means for rapidly conditioning oil and thereafter maintaining it at the proper temperature and viscosity for the most efficient and economical functioning and use.

A further object of the invention is to provide a congealable liquid conditioning device for lubrication systems, and to provide means for quickly and automatically thawing congealed lubricant to relieve congestion within the cooling unit and thereafter maintain a substantially equalized temperature of the lubricant.

A further object of the invention is to provide a congealable liquid conditioning device having the advantageous features of construction and meritorious characteristics herein mentioned.

With the above primary and other incidental objects in view as will more fully appear in the specification, the invention consists of the features of construction, the parts and combinations thereof, and the mode of operation, or its equivalent, as hereinafter described and set forth in the claims.

Referring to the accompanying drawings, wherein is shown the preferred but obviously not necessarily the only form of embodiment of the invention:

Like parts are indicated by similar characters of reference throughout the several views.

Figure 1:
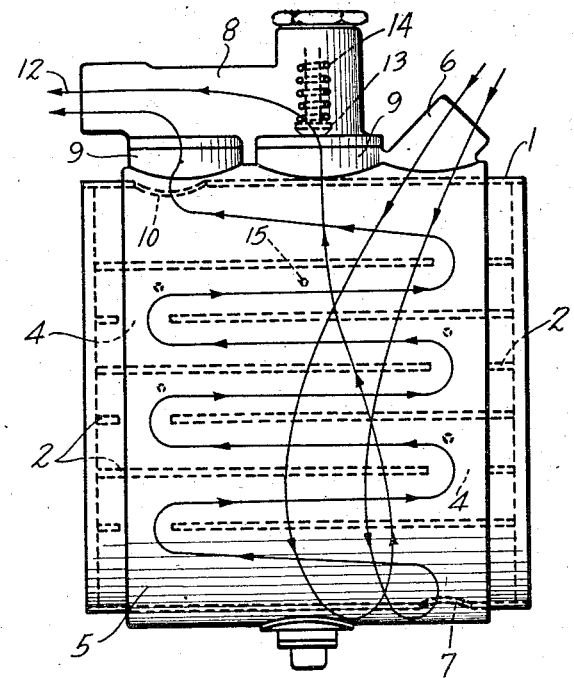
Fig. 1 is a side elevation of a congealable liquid conditioning device embodying the ideas of this invention.

Referring to the drawings, there is shown a radiator or heat exchange unit which may be of any suitable type, but which for illustrative purposes is shown as of a tubular air cooled type such as commonly used in automobile and aircraft radiators. The radiator consists of a cylindrical shell 1, in the preferred form shown divided by baffles 2 into a succession of compartments each filled with parallel tubes 3 (Fig. 3) open at their ends for flow of air therethrough and spaced apart to form flow passages therebetween for circulation of oil or other liquid to be cooled. Inter-connecting ports 4 are provided between the compartments of the radiator in the baffles 2 at alternating ends of the radiator whereby the oil or other fluid flowing through the radiator follows a tortuous path in passing from one compartment to the next. The heat dissipation obtainable in a cooler, for example, is directly proportionate to the length of the flow path through the cooler. Obviously, forms of air cooled radiator construction other than the tubular form illustrated may be utilized or, for some installations, a water cooled or similar type heat exchange unit may be employed.

Surrounding the radiator or cooler unit is a jacket or shell 5 forming a conducting passage through which oil or other fluid flows under certain predetermined temperature and viscosity conditions as will be hereinafter apparent. The jacket 5 is connected to an inlet 6 leading from the motor or power unit (not shown), and an inlet or opening 7 providing means whereby oil or other fluid entering the inelt 6 of the jacket or shell 5 may, under certain conditions of viscosity and temperature of the lubricant or other fluid, enter the radiator or core and travel in a tortuous path around the baffles 2 through such radiator or core.

As one form of means for controlling the flow of lubricant or other fluid through the passage formed by the shell or jacket 5 or through the radiator or core in accordance with the temperature and viscosity of the oil, there is shown a valve mechanism 8 mounted on suitable flanges 9 which form a part of the heat exchange unit and are disposed oppositely to the inlet or opening 7 from the jacket or shell 5 to the radiator or core. One of the flanges 9 forms a part of an opening 10 leading from the radiator or core to the outlet 12 of the valve mechanism 8. The other flange 9 forms a part of an opening from the jacket or shell 5 to the valve mechanism 8. In this latter opening there is disposed a valve 13 which is urged towards a position of closing the opening between the jacket or shell 5 and the valve mechanism 8 by a spring 14.

In the operation of this congealable liquid conditioning device as so far described, assuming that at the start of operation of the motor the lubricant is of low temperature and high viscosity, and at which time the lubricant within the radiator or core of the conditioning device will be congealed, on beginning of operation of the motor lubricant enters at inlet 6 under pressure and flows through the jacket or shell 5 in the direction indicated by the arrows. Oil pressure in the jacket or shell 5 will be exerted through the inlet or opening 7 on the interior of the radiator or core of the device. However, with the lubricant in such radiator or core in congealed condition the resistance to flow of lubricant in a tortuous path through the radiator or core will be greater than the closing effect of the spring 14 on the valve 13 which controls the outlet opening from the jacket or shell to the valve mechanism 8. Under these conditions, the lubricant entering the inlet 6 under pressure will flow completely around the radiator or core through the jacket or shell 5 to force the valve 13 open, past which the lubricant flows through the valve mechanism 8 to the outlet 12.

Figures 2, 3:
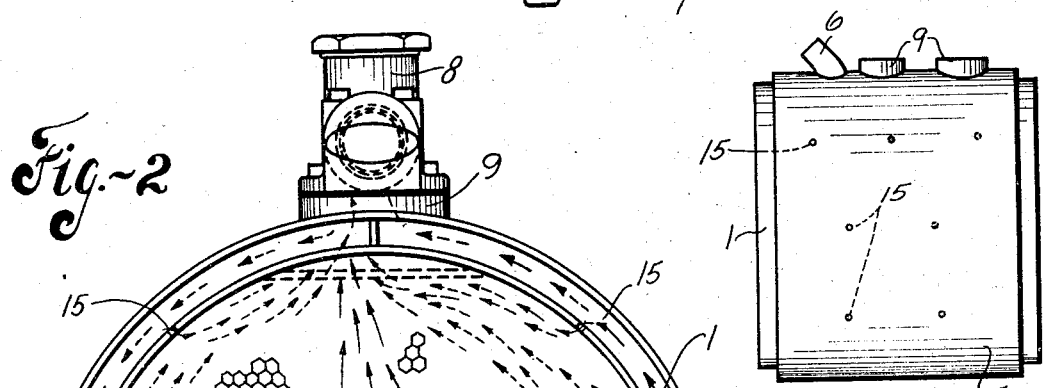
Fig. 2 is an end elevation of the device shown in Fig. 1.
Fig. 3 is a side elevation of the device shown in Fig. 1 and showing the intercommunicating ports between the by-pass and the radiator or core portion of the congealable liquid conditioning device shown in Fig. 1, this view being of the opposite side of the device from that side shown in Fig. 1.
Figure 4:
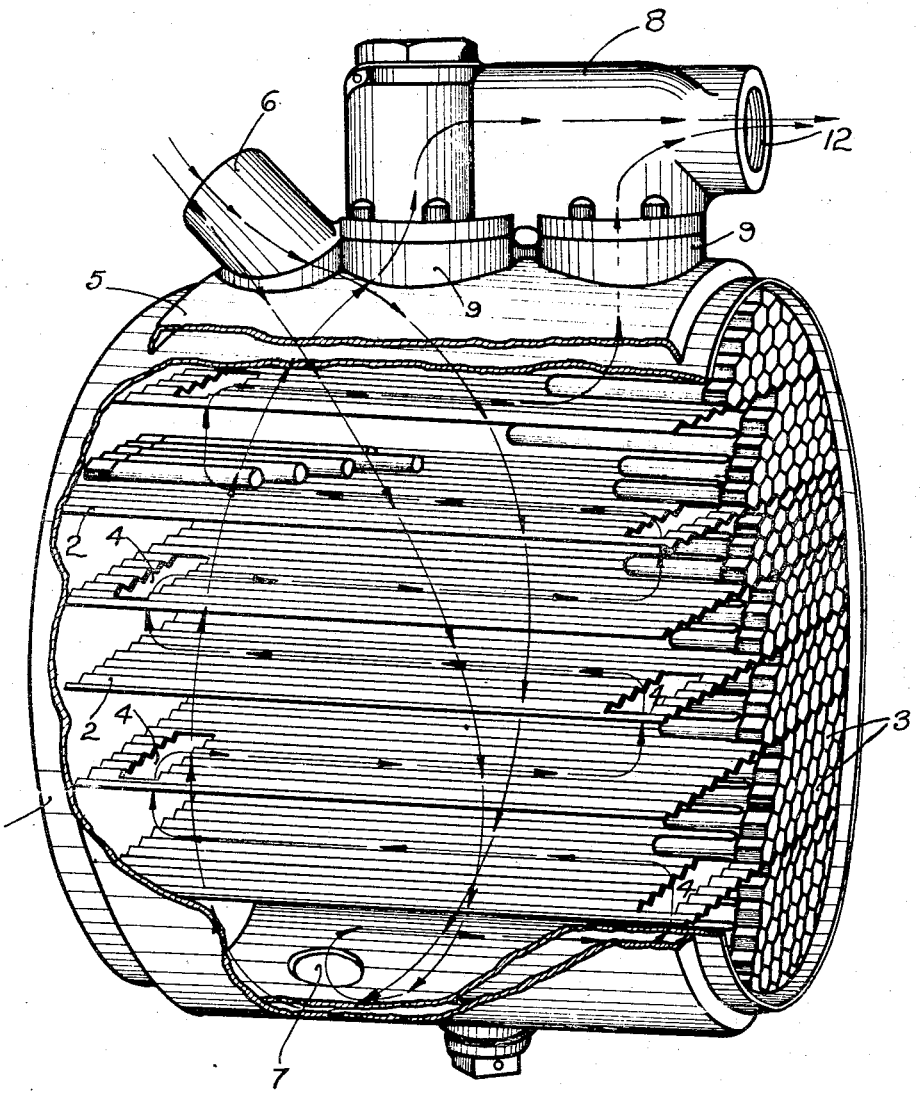
Figure 4 is a fragmentary perspective view, partly in section, showing the construction of and the oil flow paths in the congealable liquid conditioning device.

Such condition exists until the lubricant within the radiator or core has become sufficiently warm and low in viscosity that the pressure necessary to force the lubricant through passages formed by the baffles 2 and the radiator or core is less than the pressure necessary to overcome the closing effect of the spring 14 on the valve 13 whereupon the valve 13 will close and the lubricant will flow from the inlet 6 around the right-hand portion of the jacket or shell 5 as shown in Figs. 1 and 2 and thence through the inlet or opening 7 into the baffled interior of the radiator or core, and after flowing through a tortuous path as indicated by the arrows in Fig. 1, will flow out of the conditioning device through the opening 10 in the shell 1 and through the outlet 12 of the valve mechanism 8. It will be understood that the valve mechanism 8 herein described is shown merely for illustrative purposes and that various other types of valve mechanisms may be used as, for example, one including a valve 13 whose opened and closed position is governed by a thermostatic device. It will also be understood that the flow circuit herein disclosed is illustrative of only one embodiment of the invention, and that the device is susceptible to change as regards the flow circuit without departing from the scope of the invention.

It has heretofore been accepted practice to provide for heat exchange between the oil flowing around the jacket 5 and the congealed oil in the radiator or core for the purpose of warming the oil in the radiator or core so that oil will flow freely therethrough or, in addition to heat exchange between the oil flowing through the jacket or shell, to provide one or more by-passes through the central part of the radiator or core. In either event such heat exchange must take place by conduction of heat through the shell 1 or through the walls of the by-passes which are disposed diametrically across the radiator or core. It is therefore evident that the time necessary to warm the congealed oil in the radiator or core is considerable since the heat must first pass through the shell 1 or through walls of the by-passes and thence gradually toward the center of the radiator or core.

In accordance with this invention, it is relatively immaterial that the jacket or shell 5 serve as other than a flow path for the oil. Small holes or openings 15 have been provided in the radiator or core shell 1 which establish communication between the oil flowing through the jacket or shell 5 and the oil in the interior of the radiator or core. In the illustrated embodiment these small holes or openings are shown as being provided on opposite sides of the radiator shell 1 in uneven numbers and are so arranged as to provide communication between the jacket or shell 5 and the interior of the radiator or core at a plurality of levels between the inlet 7 to the radiator or core and the outlet 6 thereof, and the holes are so arranged as to provide communication from the jacket or shell to the radiator or core intermediate adjacent baffles in the radiator or core.

With such construction, considering the oil in the radiator or core as being in congealed condition, when the motor is started and oil under pressure is supplied to the inlet 6, the oil will first flow around the radiator or core through the jacket or shell 5 as hereinbefore described. Since this oil is under pressure and since a predetermined back pressure is created by reason of the loading of the valve 13 by spring 14, such oil under pressure flowing through the jacket or shell 5 will seek the path of least resistance which will be through the holes or openings 15 in the radiator or core shell 1. Oil under pressure flowing through the small openings 15 will increase considerably in velocity and will impinge directly on the congealed oil in the radiator or core at different levels between the inlet to and the outlet from the radiator. Such direct impingement of the hot oil on the congealed oil within the radiator or core will result in a direct diffusion and transfer of heat with a consequent raising of the temperature of the congealed oil within the radiator or core and a lessening of the viscosity thereof.

It has been found in practice that the pressure required to force the congealed oil out of the top baffled section of the radiator or core illustrated is considerably less than that required to force the oil out of the next section between the top baffled section and the inlet 7 of the radiator or core, and that for each succeeding section from the top section toward the inlet 7 the pressure necessary to force the oil out of such succeeding sections becomes correspondingly greater. That is, when pressure is applied from the oil flowing through the jacket or shell to the interior of the radiator or core through the openings 15 the top baffled section of the radiator or core will warm up and oil will flow therethrough first with the next succeeding sections between the top baffled section and the inlet 7 coming into flow condition in seriatim until finally all of the sections are warmed and oil will begin flowing through the inlet 7 and thence through the radiator or core to the outlet 12 since the pressure necessary to force the oil through the baffled radiator or core is less than that necessary to move the valve 13 off its seat against the resistance of the spring 14.

Correspondingly, since multiple paths are provided for oil flow from the jacket or shell 5 to the radiator or core instead of only one inlet, such as the inlet 7, being provided, the pressure drop across the radiator or core, or that pressure necessary to cause flow of oil through the baffled section of the core becomes correspondingly less. It will be understood that the size and relative disposition of the small holes or openings 15 may be varied to accommodate different conditions and requirements.

Referring to the drawings and preceding description, it will be seen that by means of this invention there has been provided a liquid conditioning device for use with congealable liquids of such nature that the initial conditioning of lubricant within the radiator or core will take place in a minimum of time, and such lubricant having once been brought to the desired temperature and viscosity will be maintained thereat without congealing within the radiator or core. This has been accomplished by providing for the direct impingement and contact of warmed lubricant with the lubricant within the radiator or core at a plurality of points intermediate the inlet and outlet of the radiator or core. Pressure is also exerted by such lubricant entering the openings to displace congealed lubricant initially in the sections to which the openings lead. That is, the construction is such that there is direct transfer of heat from one portion of the lubricant to another and a diffusion of conditioned or heated lubricant throughout the radiator or core from a multiplicity of points.

I claim:

1. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, whereby the liquid contained within the radiator body is conditioned and caused to flow through the body.

2. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body, for continuously causing a portion of the warm liquid flowing under pressure through the conduit to be by-passed at a multiplicity of points into the liquid contained in the radiator body, whereby the liquid contained within the radiator body is conditioned and caused to flow through the body.

3. A liquid conditioning device for use in a liquid circulating system wherein a liquid, the viscosity of which varies progressively with changes in temperature, is circulated under pressure and subjected to heat, including a radiator body having an outlet disposed at one side thereof and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body, for continuously causing a portion of the warm liquid flowing under pressure through the conduit to be by-passed at a multiplicity of points into the liquid contained in the radiator body, said last named means on one side of the conduit outlet leading to the radiator body being less in number than those on the other side of said conduit outlet so as to substantially equalize the transfer of heat between the liquid flowing through the conduit and the liquid contained in the body, whereby the liquid contained within the body is conditioned and caused to flow through the body.

4. A liquid conditioning device for use in a liquid circulating system wherein a liquid, the viscosity of which varies progressively with changes in temperature, is circulated under pressure and subjected to heat, including a radiator body having an outlet disposed at one side thereof and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body for continuously causing a portion of the warm liquid flowing under pressure through the conduit, to be by-passed into the liquid contained in the radiator body, said by-pass means being greater in number between the conduit outlets than those between the conduit inlet and the conduit outlet leading to the radiator body, whereby to substantially equalize the transfer of heat between the liquid flowing in the conduit and the liquid contained in the radiator body.

5. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means providing a plurality of liquid cooling zones within said radiator body, said cooling zones being interconnected to form a continuous flow path from the outlet of the conduit, which forms the inlet to the radiator body, to the outlet of the latter, means disposed between the conduit outlets for relieving the pressure on the warm liquid flowing through said conduit when the pressure exceeds a predetermined maximum, and by-pass means other than the conduit inlet and the conduit outlet which leads to the radiator body, for continuously causing a portion of the warm liquid flowing through the conduit to be by-passed into the liquid contained in each of said cooling zones, whereby the liquid contained in said cooling zones is conditioned and caused to flow therethrough.

6. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit outlet leading to the radiator body, for continuously causing a portion of the warm liquid flowing under pressure through the conduit to be by-passed into the liquid contained in the radiator body, said conduit inlet being disposed adjacent to the outlet of the radiator body so that the heat of the warm liquid entering the conduit inlet is transferred directly to the liquid in the area of the body adjacent the body outlet and then to the remainder of the liquid in the body in progressively decreasing degrees of temperature toward the outlet of the conduit which forms the inlet to said radiator body, whereby the liquid contained within the radiator body is conditioned and caused to flow through the body.

7. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite sides of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body, for continuously causing a portion of the warm liquid flowing under pressure through the conduit to be by-passed into the liquid contained in the radiator body, said conduit inlet and radiator outlet being disposed at substantially the same side of the radiator body so that the liquid passing through the conduit follows a flow path reverse to the normal liquid flow path through the radiator body, whereby the liquid contained within the radiator body is conditioned and caused to flow through the body.

8. A liquid conditioning device for use in a liquid circulating system wherein a liquid, the viscosity of which varies progressively with changes in temperature, is circulated under pressure and subjected to heat, including a radiator body having an outlet disposed at one side thereof, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of the outlets, means providing a plurality of liquid cooling zones within said radiator body, said cooling zones being interconnected to form a continuous flow path from the outlet of the conduit, which forms the inlet to the radiator body, to the outlet of the latter, means disposed between the conduit outlets for relieving the pressure on the warm liquid flowing through said conduit when the pressure exceeds a predetermined maximum, and by-pass means other than the conduit inlet and the conduit outlet which leads to the radiator body, for continuously causing a portion of the warm liquid flowing through the conduit to be by-passed into the liquid contained in each of said cooling zones, said by-pass means being disposed so as to lie closely adjacent to the radiator body outlet and the inlet of the warm liquid conduit, whereby the liquid contained within the radiator body is conditioned and caused to flow through the radiator body.

9. A liquid conditioning device for use in a liquid circulating system wherein a liquid, the viscosity of which varies progressively with changes in temperature, is circulated under pressure and subjected to heat, including a radiator body having an outlet, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body, for continuously causing a portion of the warm liquid flowing under pressure through the conduit to be by-passed into the liquid contained in the radiator body, whereby the liquid contained within the radiator body is conditioned and caused to flow through the body.

10. A liquid conditioning device for use in a liquid circulating system wherein a liquid, the viscosity of which varies progressively with changes in temperature, is circulated under pressure and subjected to heat, including a radiator body having an outlet, and having a passage for circulation of the liquid, and through which passage the liquid flows in heat exchange relationship with a cooling medium, a warm liquid conduit disposed in heat exchange relationship with the body and having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through at least one of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body, for continuously causing a portion of the warm liquid flowing under pressure through the conduit to be by-passed into the liquid contained in the radiator body, whereby the liquid contained within the radiator body, is conditioned and caused to flow through the body.

11. A liquid conditioning device for use in a liquid circulating system wherein a liquid, the viscosity of which varies progressively with changes in temperature, is circulated under pressure and subjected to heat, including a radiator body having an outlet, and having a passage for circulation of the liquid, and through which passage the liquid flows in heat exchange relationship with a cooling medium, a warm liquid conduit having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body, for continuously causing a portion of the warm liquid flowing under pressure through the conduit to be by-passed into the liquid contained in the radiator body, whereby the liquid contained within the radiator body is conditioned and caused to flow through the body.

12. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, means for introducing lubricant under heat and pressure into the inlet of the radiator body, means for continuously introducing a part of the lubricant flowing under heat and pressure in the lubricant introducing means, into the liquid in the flow path of the radiator body at a point between the inlet and outlet of the latter so as to reduce the viscosity of the lubricant in said flow path of the radiator body, and means for maintaining pressure on the incoming lubricant and for relieving said pressure when the latter reaches a predetermined degree.

13. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, means for introducing lubricant under heat and pressure into the inlet of the radiator body, means for continuously introducing a part of the lubricant flowing under heat and pressure in the lubricant introducing means, into the liquid in the flow path of the radiator body to at least one side of the inlet of the latter so as to reduce the viscosity of the lubricant in said flow path of the radiator body, and means for maintaining pressure on the incoming lubricant and for relieving said pressure when the latter reaches a predetermined degree.

14. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, means for introducing lubricant under heat and pressure into the inlet of the radiator body, means for continuously introducing a part of the lubricant flowing under heat and pressure in the lubricant introducing means, into the liquid in the flow path of the radiator body at spaced points between the inlet and outlet of the latter so as to reduce the viscosity of the lubricant in said flow path of the radiator body, and means for maintaining pressure on the incoming lubricant and for relieving said pressure when the latter reaches a predetermined degree.

15. A method of conditioning a circulating body of oil for an engine, where such body of oil is directed through a confined cooling space having an inlet and an outlet and in which space the said oil body approaches a non-flowing viscosity under extreme low temperature conditions, which consists in flowing oil under heat and pressure into heat transmitting relation with the oil body in the confined space and directing such flowing oil through the inlet of the confined space and against the oil body therein to compel a flow of said body through said confined space when said body is conditioned for such flow, said flowing oil under heat and pressure being additionally utilized to directly and continually subject the oil body in the confined space to the heat and pressure contact thereof at spaced points between the inlet and the outlet of the confined space so as to condition the oil body in the confined space for flow and to maintain the same in a condition of fluidity.

ALLAN C. HOFFMAN.